(12) United States Patent
Scott et al.

(10) Patent No.: US 6,728,783 B1
(45) Date of Patent: Apr. 27, 2004

(54) INTELLIGENT NETWORK

(75) Inventors: Frank F Scott, Hale Brampton (CA); Howard J Darwen, London (GB); John A Storrie, Maidenhead (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/346,321

(22) Filed: Jul. 2, 1999

(51) Int. Cl.$^7$ .................. G06F 15/16; G06F 15/173
(52) U.S. Cl. .................. 709/243; 709/201; 709/227; 709/228; 709/238; 379/221.08; 379/221.11
(58) Field of Search .................. 709/201, 202, 709/227, 228, 238, 236, 243; 370/236, 389; 379/209.01, 221.11, 221.08

(56) References Cited

U.S. PATENT DOCUMENTS

| | | | | |
|---|---|---|---|---|
| 5,438,568 A | * | 8/1995 | Weisser, Jr. .................. | 370/389 |
| 5,479,495 A | * | 12/1995 | Blumhardt .................. | 379/209.01 |
| 5,761,290 A | * | 6/1998 | Farris et al. .................. | 379/221.11 |
| 5,862,129 A | * | 1/1999 | Bell et al. .................. | 370/236 |
| 6,038,305 A | * | 3/2000 | McAllister et al. .................. | 379/201.02 |
| 6,167,119 A | * | 12/2000 | Bartholomew et al. .................. | 379/88.04 |

* cited by examiner

Primary Examiner—Bunjob Jaroenchonwanit
Assistant Examiner—Paul Kang
(74) Attorney, Agent, or Firm—Barnes & Thornburg

(57) ABSTRACT

A telecommunications network includes a service control processor and a plurality of network nodes, in which the network is arranged to operate under a programmable intelligent network protocol. The protocol incorporates a hierarchical control relationship in which the nodes incorporate a degree of intelligence.

13 Claims, 1 Drawing Sheet

INTELLIGENT NETWORK

BACKGROUND OF THE INVENTION

This invention relates generally to an intelligent network and in particular to a flexible intelligent network and method of operation thereof.

FIELD OF THE INVENTION

The value of intelligent networks is based in part on the following fundamental beliefs:

1. Rapid Service Deployment: intelligent networks provide the network operator with the ability to rapidly rollout new services, which results in significant market advantage.

2. Vendor Interoperability: intelligent networks allow the network operator easily to deploy network components, such as Service Switching Points (SSP), Service Control Processor (SCP), and Intelligent Peripheral devices (IP) from multiple vendors. The use of intelligent networks should, therefore, result in both a cost reduction and greater choice of solutions.

However, neither of these beliefs has been fully realised, due to the difficulty in ensuring functional compatibility between different vendors components, as well as compatibility between components within a given vendor's product portfolio.

The primary issues which are left un-addressed by currently available intelligent networks include, the following:

1. The set of intelligent network operations and parameters which are supported for a given service.

For example: The Service Control Processor service logic places demands on the supported set provided by the Service Switching Point.

The Service Switching Point requires a certain information content in the Service Control Processor intelligent network messages.

There are several aspects of the components functional behaviour which is considered "network specific" or "beyond the scope" of the intelligent network specification.

There are several aspects of the intelligent network specification that are vague enough to result in different interpretations and implementations by the intelligent network components.

2. The assumed component behaviour.

For Example: If the Service Control Processor does not explicitly instruct the Service Switching Point on how to behave functionally, when is its default behaviour invoked.

If the Service Switching Point explicitly provisions some functional behaviour, what happens if the Service Control Processor provides conflicting instructions.

In short, what are the rules of engagement, particularly considering that the specification indicates that the Service Control Point is the final control of Service Switch Point functional behaviour.

The result is a need for an unexpectedly high level of hand crafting of the operations, parameters and functional behaviour supported by the individual intelligent network components in order to ensure their inter-operability. This may be necessary on a per-service, per-market, or per-configuration basis.

Often the determination as to whether two components will interact properly is only made as a result of analysis, and may be followed by incremental development on the part of one or both components to ensure interoperability. This difficulty may compromise the perceived benefits of intelligent networks for the network operator.

Several solutions to this problem have been attempted, with varying degrees of limited success.

Solution 1: White Book Transaction Capabilities Application Part (TCAP) Context Negotiation: The intelligent network standards proposes a strategy for component/vendor inter-working which is based on the notion of a "Context". This pre-defined context is negotiated between two intelligent network components during the establishment of the TCAP dialogue. In cases where one component is unable to support the Context attempted by the other component it will re-select a less-advanced Context.

Solution 1 Shortcoming: The problem with Context Negotiation is that it is too limited in addressing all of the potential problems as earlier described. It only allows for the selection of a set of operations and parameters. The permutation and combinations required to address all possible network component behavioural requirements would be immense. In short it is only practical for well-controlled network configurations, where the network operator has defined very specific behaviour. One example is the Austria Telecom network, where a subset of Context Negotiation was mandated by the Telco.

Solution 2: Default to the lowest common denominator: The functional behaviour of the individual network components is analysed. For example, if one component does not support a function required by the Service Control Processor service, the part of the service which requires that function must not be invoked on the Service Control Processor.

Solution 2 Shortcoming: The network operator is not provided with the required functions.

Solution 3: Incremental Development on one of the intelligent network component platform to ensure compatibility for the given configuration.

Solution 3 Shortcoming: This is a very cumbersome and expensive way to ensure interoperability. Alteration of the behaviour of one of the intelligent network components for a specific configuration is orthogonal to the spirit of having open interfaces driven by standards.

SUMMARY OF THE INVENTION

It is an object of the present invention to address the problem of excessive hand crafting of nodes within a telecommunications network.

It is a further object of the present invention to address the problem of excessive datafilling of nodes within a telecommunications network.

According to a first aspect of the present invention there is provided a telecommunications network including a service control processor and a plurality of network nodes, in which the network is arranged to operate under a programmable intelligent network protocol, incorporating a hierarchical control relationship in which the nodes incorporate a degree of intelligence.

According to a second aspect of the present invention there is provided a method of operating a telecommunications network including a service control processor and a plurality of network nodes, in which the network is arranged to operate under a programmable intelligent network protocol, incorporating a hierarchical control relationship in which the nodes incorporate a degree of intelligence.

According to a third aspect of the present invention there is provided a program for a computer stored in a computer readable medium, which is arranged, when run on a computer in a telecommunications network including a service control processor and a plurality of network nodes, to cause the computer to operate the network under a programmable intelligent network protocol, incorporating a hierarchical control relationship in which the nodes incorporate a degree of intelligence.

According to a fourth aspect of the present invention there is provided a service switching point for use in a telecommunications network including a service control processor and a plurality of network nodes, in which the service switching point is arranged to operate under a programmable intelligent network protocol, incorporating a hierarchical control relationship in which the service switching point incorporate a degree of intelligence.

According to a fifth aspect of the present invention there is provided a service control processor for use in a telecommunications network including said service control processor and a plurality of network nodes, in which the service control processor is arranged to operate under a programmable intelligent network protocol, incorporating a hierarchical control relationship in which the service switching point incorporate a degree of intelligence.

Preferably, the nodes include service switching points.

Preferably, the behaviour of a service switching point is controllable using service profiles, which govern specific operation within the service switching points.

Preferably, the specific operations of the service switching point which are governed by the service profiles include: Parameters for Initial Query, or subsequent response; Trigger detection points supported; Billing behaviour; Signalling Connection Control Part Global Title Translation (SCCP GTT) network routing strategy; Re-Triggering capability.

It is an advantage of the present invention that the format of information in parameter establishing profiles is also an efficient mechanism for minimisation of provisioned datafill at the Service Switch Point. There is no need to datafill more that the minimum number of profiles, if the profiles are linked in some vendor-specific manner to the specific attribute of the service invocation (e.g. ServiceKey).

BRIEF DESCRIPTION OF THE DRAWINGS

The invention will be better understood from the following description of a telecommunications network in accordance with the present invention, together with reference to the accompanying drawings, in which.

DETAILED DESCRIPTION

Figure 1:
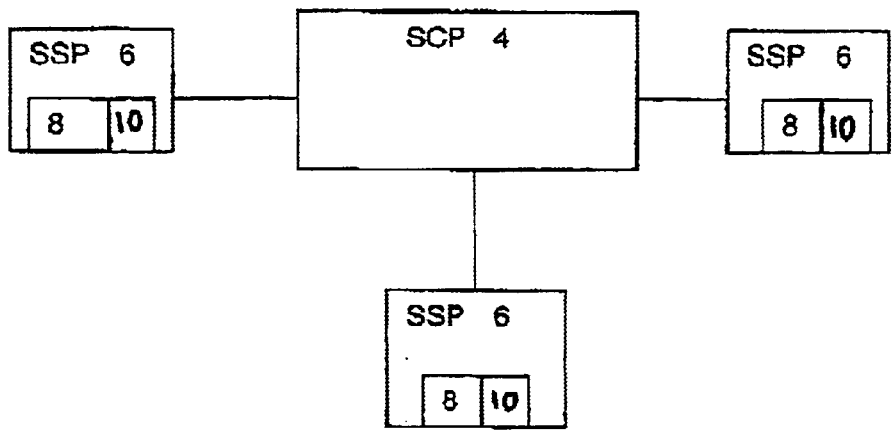
FIG. 1 illustrates a telecommunications network in accordance with the present invention.

Referring to the drawings FIG. 1, illustrates a telecommunications network 2 in accordance with the present invention. The telecommunications network 2 includes a service control processor 4 and a plurality of network nodes, in the form of service switching points 6. The network 2 is arranged to operate under a programmable intelligent network protocol, incorporating a hierarchical control relationship in which the service switching points 6 incorporate a degree of intelligence.

The behaviour of a service switching point 6 is controllable using service profiles 10, which govern specific operation within the service switching points 6, and which are stored in the switching points 6 in memory means 8'.

The specific operations of the service switching point 6 which are governed by the service profiles include: Parameters for Initial Query, or subsequent response; Trigger detection points supported; Billing behaviour; SCCP GTT network routing strategy; Re-Triggering capability.

A service profile is not limited in any form or fashion to any particular behaviour nor is it associated with a particular protocol, parameter or operation as it is an extensible concept that can be used to characterise the behaviour of any Service Switching Point.

In many cases the Intelligent Internet Application Protocol (INAP) specification requires that all the available protocol related information is provided to the service plane in the optional parameter stream of the initial request. This is, in many cases an unnecessary overhead as the service platform may only require a few parameters to operate the service and the unused information adds a real time cost to the Service Switching Point and service platform as well as increasing the network overhead of transporting large messages. This is an example of grooming the initial query to contain the relevant agreed parameters.

In many Service Switching Points there is a certain level of default call processing behaviour which, in the absence of instructions from other services, will be executed. Within the service provided in collaboration between the Service Switching Point and the service plane this behaviour might not be that which is desired by either the end user or the operator. This behaviour might well be more fully defined in a later issue of the particular Intelligent Network specification but may also be absent. It may also be a requirement of an inter-connection agreement between two or more networks.

In either case it is essential for the operator to be able to define the behaviour of the Service Switching Point in terms of the appropriate signalling, billing or other activity. This may often require that the default Service Switching Point call processing behaviour be altered to fully effect the service.

Figure 2:
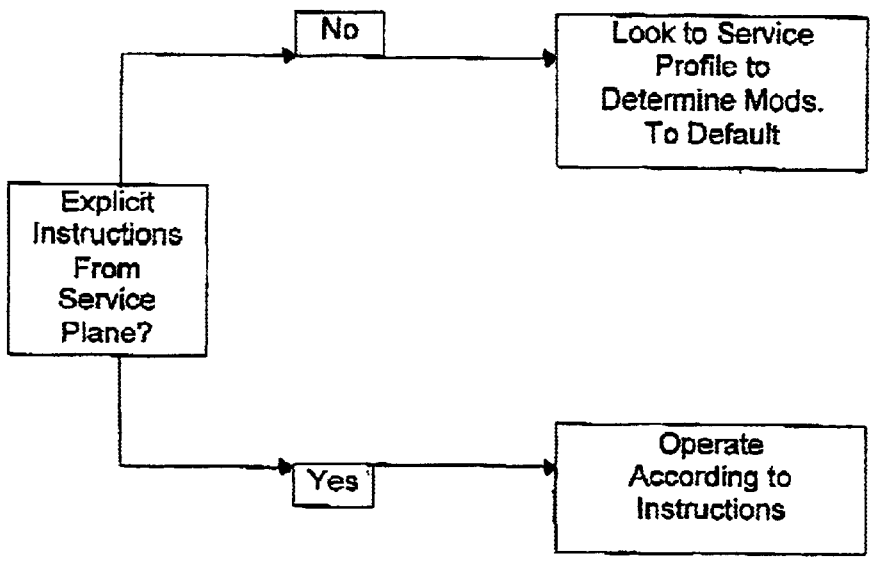
FIG. 2 illustrates a process occurring in a service switching point of the network of FIG. 1 in accordance with the present invention.

In the absence of explicit instructions from the service plane then the service switching point 6 will look to any service profile attributes to determine if it should modify the default call processing behaviour, as shown in FIG. 2.

Use of the service profile concept allows the operator the flexibility to control their telecommunications network in the most advantageous manner.

There follows two examples of the use of programmable intelligent networks.

EXAMPLE 1

Within the Austrian national network the charging of calls is performed by providing meter pulses to the end terminal. As the cost of the call increases, due to various factors the time between pulses decreases. These pulses are provided to the users end equipment where many people have a device that counts the pulses and allows them to determine the current cost of their telephone bill.

When the Intelligent Network "free-phone" service was deployed, part of the service played an announcement to the caller, indicating that their call was being auctioned and they should hang on. As a by-product of this action the default call processing behaviour was to answer the call and this caused the end users meter to begin to increment. The user was being charged for a free phone call.

By using the Service Profiling the default call processing behaviour may be modified and the call no longer answered.

EXAMPLE 2

When an initial service is requested from an Intelligent Network the operator of the switch often has a preference for capturing certain billing information in certain AMA modules. An AMA module is a Bellcore compliant billing format.

To aid their downstream billing processing they wish to select the type of module from several optional modules available in the Bellcore specification. By using the Service Profiling concept the operators are able to select the required module and have the intelligent network software populate the required fields. This allows the intelligent network software to influence the default behaviour of the call-processing platform.

Modifications may be incorporated with out departing from the scope or spirit of the invention.

We claim:

1. A telecommunications network including a service control processor and a plurality of network nodes, in which the network is arranged to operate under a programmable intelligent network protocol, incorporating a hierarchical control relationship in which each network node incorporates a degree of intelligence including Parameters for Initial Query, or subsequent response; Trigger detection points supported; Billing behaviour; SCCP GTT network routing strategy; Re-Triggering capability, the hierarchical control relationship between each network node and the service control processor being arranged such that in the absence of explicit instructions from the service control processor each network node uses its own intelligence to determine if it should modify a default call processing behaviour.

2. A telecommunications network as claimed in claim 1, wherein the nodes include service switching points.

3. A telecommunications network as claimed in claim 2, wherein the behaviour of a service switching point is controllable using service profiles which govern specific operation within the service switching points.

4. A method of operating a telecommunications network including a service control processor and a plurality of network nodes, in which the network is arranged to operate under a programmable intelligent network protocol, incorporating a hierarchical control relationship in which each node incorporates a degree of intelligence, including parameters for Initial Query, or subsequent response; Trigger detection points supported; Billing behaviour; SCCP GTT network routing strategy; Re-Triggering capability the hierarchical control relationship between each network node and the service control processor being arranged such that in the absence of explicit instructions from the service control processor each network node uses its own intelligence to determine if it should modify a default call processing behaviour.

5. A method as claimed in claim 4, wherein the nodes include service switching points.

6. A method as claimed in claim 5, wherein the behaviour of a service switching point is controllable using service profiles which govern specific operation within the service switching points.

7. A method as claimed in claim 6, only those profiles associated with the specific operation undergo a datafill.

8. A program for a computer stored in a computer readable medium, which is arranged, when run on a computer in a telecommunications network including a service control processor and a plurality of network nodes, to cause the computer to operate the network under a programmable intelligent network protocol, including Parameters for Initial Query, or subsequent response; Trigger detection points supported; Billing behaviour; SCCP GTT network routing strategy; Re-Triggering capability incorporating a hierarchical control relationship in which each network node incorporates a degree of intelligence, the hierarchical control relationship between each node and the service control processor being arranged such that in the absence of explicit instructions from the service control processor each node uses its own intelligence to determine if it should modify a default call processing behaviour.

9. A program for a computer as claimed in claim 8, wherein the nodes include service switching points.

10. A program for a computer as claimed in claim 9, wherein the behaviour of a service switching point is controllable using service profiles which govern specific operation within the service switching points.

11. A service switching point for use in a telecommunications network including a service control processor and a plurality of network nodes, in which the service switching point is arranged to operate under a programmable intelligent network protocol, incorporating a hierarchical control relationship in which the service switching point incorporates a degree of intelligence, including Parameters for Initial Query, or subsequent response; Trigger detection points supported; Billing behaviour; SCCP GTT network routing strategy; Re-Triggering capability the hierarchical control relationship between said service switching point and the service control processor being arranged such that in the absence of explicit instructions from the service control processor the service switching point uses its own intelligence to determine if it should modify a default call processing behaviour.

12. A service switching point as claimed in claim 11, wherein the behaviour of a service switching point is controllable using service profiles which govern specific operation within the service switching points.

13. A service control processor for use in a telecommunications network including said service control processor and a plurality of network nodes, in which the service control processor is arranged to operate under a programmable intelligent network protocol, incorporating a hierarchical control relationship in which the service switching point incorporate a degree of intelligence, including Parameters for Initial Query, or subsequent response; Trigger detection points supported; Billing behaviour; SCCP GTT network routing strategy; Re-Triggering capability the hierarchical control relationship between the service switching point and the service control processor being arranged such that in the absence of explicit instructions from the service control processor the service switching point uses its own intelligence to determine if it should modify a default call processing behaviour.

* * * * *